US011360255B2

(12) United States Patent
Oh et al.

(10) Patent No.: US 11,360,255 B2
(45) Date of Patent: Jun. 14, 2022

(54) DISPLAY DEVICE

(71) Applicant: LG Display Co., Ltd., Seoul (KR)

(72) Inventors: Ji-Soon Oh, Paju-si (KR); Yeoun-Jei Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/705,580

(22) Filed: Dec. 6, 2019

(65) Prior Publication Data

US 2020/0183074 A1 Jun. 11, 2020

(30) Foreign Application Priority Data

Dec. 11, 2018 (KR) .................. 10-2018-0158751

(51) Int. Cl.
*G02F 1/13357* (2006.01)
*F21V 8/00* (2006.01)

(52) U.S. Cl.
CPC ........... *G02B 6/0028* (2013.01); *G02B 6/003* (2013.01); *G02B 6/009* (2013.01); *G02B 6/0021* (2013.01); *G02F 1/133615* (2013.01)

(58) Field of Classification Search
CPC .... G02B 6/0028; G02B 6/0021; G02B 6/003; G02B 6/009; G02F 1/133615
See application file for complete search history.

(56) References Cited

U.S. PATENT DOCUMENTS

| 2014/0185316 A1* | 7/2014 | Kim ..................... G02B 6/0065 362/607 |
| 2014/0185320 A1* | 7/2014 | Wang He ............. G02B 6/0028 362/610 |
| 2014/0368769 A1* | 12/2014 | Lee ....................... G02B 6/0083 349/65 |
| 2015/0002771 A1* | 1/2015 | Nakamoto ............ G02F 1/1368 349/42 |
| 2015/0219966 A1* | 8/2015 | Song ........................ F21V 7/04 362/97.3 |
| 2015/0368769 A1* | 12/2015 | Prest ....................... C22C 45/00 148/527 |
| 2016/0327724 A1* | 11/2016 | Wu ....................... G02B 6/0038 |

FOREIGN PATENT DOCUMENTS

CN 108303824 A * 7/2018 ....... G02F 1/133607

* cited by examiner

*Primary Examiner* — Phu Vu
(74) *Attorney, Agent, or Firm* — Morgan, Lewis & Bockius LLP (57) ABSTRACT

A display device comprises a liquid crystal panel, an optical sheet under the liquid crystal panel, and a light emitting diode (LED) assembly configured to supply a light to the liquid crystal panel through the optical sheet. The LED assembly includes a printed circuit board (PCB), a plurality of LED chips on the PCB and configured to emit a blue colored light, a fluorescent lens over the plurality of LED chips, and a light guiding panel between an adjacent two of the plurality of LED chips.

20 Claims, 10 Drawing Sheets

DISPLAY DEVICE

CROSS-REFERENCE TO RELATED APPLICATIONS

The present application claims the benefit of Korean Patent Application No. 10-2018-0158751, filed in the Republic of Korea on Dec. 11, 2018, which is hereby incorporated by reference in its entirety for all purposes as if fully set forth herein.

BACKGROUND

Field of the Disclosure

The present disclosure relates to a display device, and more particularly, to a liquid crystal display device where a uniform linear light of high luminance may be obtained due to a light emitting diode assembly having a plurality of blue light emitting diode chips.

Discussion of the Background

Recently, as information and mobile communication technologies progress, display devices that process and display a large amount of information have rapidly advanced. The display devices may be classified into an emissive type display device having a self-emissive property, and a non-emissive type display device that includes an additional light source.

For example, the non-emissive type display device may include a liquid crystal display (LCD) device. Because the LCD device does not include a self-emissive element, an additional light source may be required. As a result, a backlight unit having a light source may be disposed on a rear surface of a liquid crystal panel, and may supply a light to the liquid crystal panel to display an image.

The backlight unit may include one of a cold cathode fluorescent lamp (CCFL), an external cathode fluorescent lamp (ECFL) and a light emitting diode (LED) as the light source. The LED has been widely used because of its advantages such as small size, low power consumption, and high reliability.

The LCD device has been widely used for a monitor of a desktop computer and a wall-mountable television, as well as a portable computer. The LCD device having a reduced weight and a reduced volume, even with a wide display area has been researched.

For example, a narrow bezel where a display area is enlarged and a non-display area (e.g., a bezel) is reduced or minimized may be desired in an LCD device having a light weight and a thin profile.

The backlight unit may be formed based on various optical designs for supplying a planar light of a high quality to the liquid crystal panel. One of various optical designs is an optical gap or an air gap between the LED and a light guide plate, or between the LED and a diffusing plate.

Because the LED is a point light source having a predetermined directional angle, lights emitted from two or three adjacent LEDs are overlapped and mixed, and then enter the light guide plate or the diffusing plate. When the gap between the LED and the light guide plate or between the LED and the diffusing plate is relatively small, a hot spot where a region corresponding to the LED has a luminance higher than other regions may occur, and a dark portion where the light emitted from the LED is not supplied may be generated between the adjacent LEDs.

As a result, deterioration such as an LED stain may be caused, and a display quality of the LCD device is reduced due to a non-uniform luminance.

To solve the above problems, the distance between the adjacent LEDs may be reduced. However, because this may cause the number of LEDs to increase, the cost increases and a heat radiation problem is caused. In addition, the power consumption increases.

SUMMARY

Accordingly, the present disclosure is directed to a display device having a light emitting diode assembly that substantially obviates one or more problems due to limitations and disadvantages of the prior art.

An object of the present disclosure is to provide a display device where a uniform linear light is obtained using a light emitting diode.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes a liquid crystal panel; an optical sheet under the liquid crystal panel; and a light emitting diode (LED) assembly configured to supply a light to the liquid crystal panel through the optical sheet, wherein the LED assembly includes a printed circuit board (PCB); a plurality of LED chips on the PCB and configured to emit a blue colored light; a fluorescent lens over the plurality of LED chips; and a light guiding panel between an adjacent two of the plurality of LED chips.

It is to be understood that both the foregoing general description and the following detailed description are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure. In the drawings.

DETAILED DESCRIPTION

Reference will now be made in detail to the present disclosure, examples of which are illustrated in the accompanying drawings.

Figure 1:
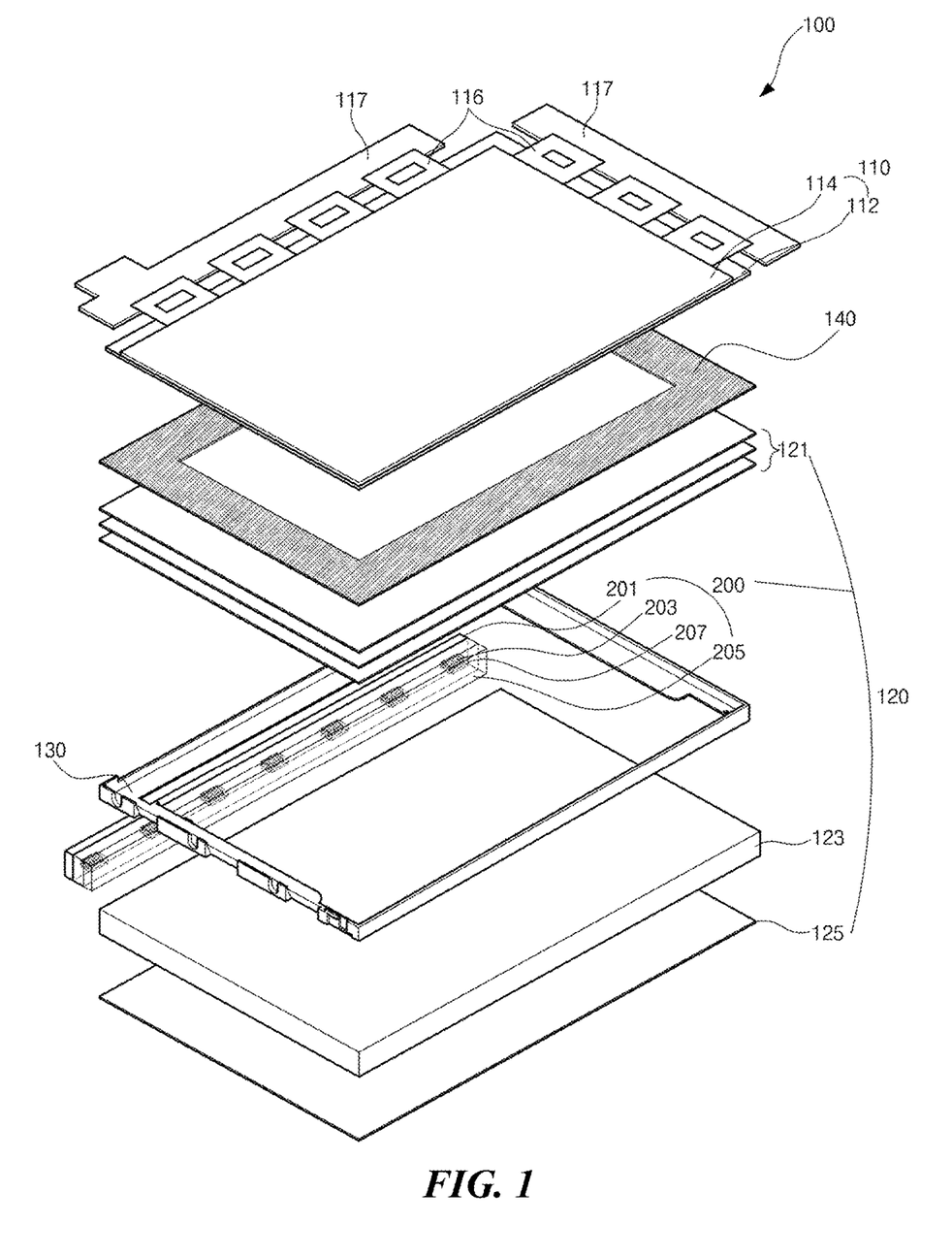
FIG. 1 is an exploded perspective view showing a display device according to a first embodiment of the present disclosure.

FIG. 1 is an exploded perspective view showing a display device according to a first embodiment of the present disclosure.

In FIG. 1, a display device 100 includes a liquid crystal panel 110, a backlight unit 120 and a frame (guide panel) 130. The backlight unit 120 is disposed on a rear surface of the liquid crystal panel 110. The frame 130 having a rectangular ring shape surrounds edge portions of the liquid crystal panel 110 and the backlight unit 120 to modularize the liquid crystal panel 110 and the backlight unit 120.

The liquid crystal panel 110 includes first and second substrates 112 and 114 facing and spaced apart from each other, and a liquid crystal layer (not shown) between the first and second substrates 112 and 114.

In the liquid crystal panel 110 of an active matrix type, a plurality of gate lines and a plurality of data lines are formed on an inner surface of the first substrate (e.g., lower substrate, array substrate) 112. The gate line and the data line cross each other to define a pixel, and a thin film transistor (TFT) is connected to the gate line and the data line. A transparent pixel electrode in each pixel is connected to the TFT.

In addition, a black matrix covering the gate line, the data line, and the TFT is formed on an inner surface of the second substrate (e.g., upper substrate, color filter substrate) 114, and a color filter layer including red, green, and blue color filters is formed on the black matrix. A transparent common electrode is formed on the color filter layer and the black matrix.

A first alignment layer is disposed between the first substrate 112 and the liquid crystal layer, and a second alignment layer is disposed between the second substrate 114 and the liquid crystal layer. The first and second alignment layers determine a direction of an initial arrangement of a liquid crystal molecule. A seal pattern is disposed between the first and second substrates 112 and 114 along an edge of the first and second substrates 112 and 114 to prevent a leakage of the liquid crystal layer.

First and second polarizing plates 119a and 119b (e.g., of FIGS. 5A and 5B) selectively transmitting a predetermined polarization component are disposed on outer surfaces of the first and second substrates 112 and 114, respectively.

A printed circuit board (PCB) 117 is connected to at least one side of the liquid crystal panel 110 through a connector 116 such as a flexible printed circuit (FPC) and a tape carrier package (TCP). The PCB 117 is bent and contacts a side surface and a rear surface of the liquid crystal panel 110.

In the liquid crystal panel 110, the TFT connected to the gate line is turned on by a gate signal supplied to the gate line, and a data signal of the data line is applied to the pixel electrode. As a result, an electric field is generated between the pixel electrode and the common electrode, and the arrangement direction of the liquid crystal molecule is changed by the electric field to cause a transmittance difference.

The backlight unit 120 is disposed under the liquid crystal panel 110. The backlight unit 120 supplies a light to the liquid crystal panel 110 so that the transmittance change of the liquid crystal panel 110 can be realized as an image.

The backlight unit 120 includes a light guide plate 123 of a plate shape, a light emitting diode (LED) assembly 200 arranged along at least one longitudinal side of the light guide plate 123, a reflecting plate 125 under the light guide plate 123 and a plurality of optical sheets 121 over the light guide plate 123.

A light emitted from the LED assembly 200 passes in the light guide plate 123 due to a total reflection to be uniformly spread, and the light guide plate 123 supplies a uniform planar light to the liquid crystal panel 110.

To supply a uniform planar light, the light guide plate 123 may include a first pattern corresponding to a white colored light on a lower surface thereof. For example, to guide the incident white colored light, the light guide plate 123 may include an elliptical pattern, a polygonal pattern, or a hologram pattern. The first pattern may be formed on a lower surface of the light guide plate 123 through a printing method or an injecting method.

The reflecting plate 125 is disposed under the light guide plate 123 and reflects a light through the lower surface of the light guide plate 123 toward the liquid crystal panel 110 to increase a luminance of the light.

The plurality of optical sheets 121 over the light guide plate 123 include a diffusing sheet and at least one collimating sheet. Further, the plurality of optical sheets 121 may further include various functional sheets such as a reflective polarizing film, which is referred to as a dual brightness enhancement film (DBEF).

While the light through the light guide plate 123 passes through the plurality of optical sheets 121, the light is processed to become a planar light of high quality through diffusion and collimation. As a result, a uniform planar light enters the liquid crystal panel 110.

The LED assembly 200 of a light source of the backlight unit 120 is disposed at a side of the light guide plate 123 to face into an incident surface of the light guide plate 123. A light from the LED assembly 200 enters the light guide plate 123 through the incident surface.

The LED assembly 200 includes a printed circuit board (PCB) 201, a plurality of LED chips 203 and a fluorescent lens 205. The plurality of LED chips 203 are mounted on the PCB 201 to be separated from each other. The fluorescent lens 205 has a bar shape corresponding to a longitudinal direction of the PCB 201 and is disposed over the plurality of LED chips 203.

The plurality of LED chips 203 may include a blue LED chip having an excellent emission efficiency and an excellent luminance, and the fluorescent lens 205 may include a yellow fluorescent material.

A blue colored light emitted from the blue LED chip of the plurality of LED chips 203 passes through the fluorescent lens 205. The yellow fluorescent material of the fluorescent lens 205 generates a yellow colored light by a part of the blue colored light, and the other part of the blue colored light and the yellow colored light are mixed. As a result, a white colored light is emitted from the LED assembly 200.

Because the white colored light is emitted from a front surface of the fluorescent lens 205 along the longitudinal direction of the LED assembly 200 (e.g., the longitudinal direction of the fluorescent lens 205 of a bar shape), the LED assembly 200 supplies a linear light.

The LED assembly 200 supplying a linear light may have advantages such as a small size, a low power consumption, and a high reliability of the plurality of LED chips 203. Occurrence of a dark portion where the lights emitted from the plurality of LED chips 203 are not overlapped and mixed between the adjacent LED chips 203 may be prevented even when a gap (e.g., an optical gap, an air gap) d1 and d2 (e.g., of FIGS. 3A and 3B) between the light guide plate 123 and the plurality of LED chips 203 is reduced to obtain a narrow bezel. As a result, occurrence of deterioration such as an LED stain may be prevented.

In addition, because the number of the plurality of LED chips 203 may not increase, problems such as an increase of power consumption and fabrication cost may be prevented to nevertheless obtain a light weight and a thin profile.

For example, the LED assembly 200 according to a first embodiment of the present disclosure further includes a light guiding panel 207 between the plurality of LED chips 203. The light guiding panel 207 guides the blue colored light emitted from the plurality of LED chips 203, and the LED assembly 200 supplies a uniform linear light of a high luminance without increasing the number of the plurality of LED chips 203.

As a result, disadvantages such as an increase of power consumption and fabrication cost are prevented. In addition, because the uniform white colored light of a linear light is emitted from the LED assembly 200, an optical gap or an air gap may be further reduced and a narrow bezel may be obtained.

The liquid crystal panel 110 and the backlight unit 120 are modularized by the frame 130. An edge portion of the backlight unit 120 is surrounded by the frame 130, and the liquid crystal panel 110 over the backlight unit 120 is attached and fixed to the frame 130 through an adhesive pad such as a double sided tape. The reflecting plate 125 is attached and fixed to the frame 130 through an adhesive pad such as a double sided tape, such that the liquid crystal panel 110 and the backlight unit 120 are modularized and integrated.

A light shielding tape 140 is disposed between the liquid crystal panel 110 and the backlight unit 120. An adhesive is coated on upper and lower surface of the light shielding tape 140 to fix the backlight unit 120 and the liquid crystal panel 110. The light shielding tape 140 has a black color to prevent a leakage of a light emitted from the backlight unit 120.

The frame 130 may be referred to as a main frame, a guide panel, a main supporter, or a mold frame. The frame 130 may be formed through a molding method or may include a metallic material for rigidity. For example, the frame 130 may be formed through an injecting method using aluminum (Al).

A bottom frame may be disposed under the reflecting plate 125, and a top frame may be disposed over the liquid crystal panel 110.

The backlight unit 120 has a side light type. The plurality of LED chips 203 may have a multiple layered structure on the PCB 201, and two LED assemblies may be disposed on two opposite incident surfaces of the light guide plate 123.

In the LED assembly 200 of the backlight unit 120 of the display device 100 according to a first embodiment of the present disclosure, the plurality of LED chips 203 spaced apart from each other are mounted on the PCB 201, the fluorescent lens 205 having a bar shape and including a yellow fluorescent material is disposed over the plurality of LED chips 203, and the light guiding panel 207 is disposed between the adjacent two of the plurality of LED chips 203.

As a result, the display device 100 may have advantages such as a small size, a low power consumption, and a high reliability due to the plurality of LED chips 203 emitting a blue colored light. In addition, the display device 100 may have a narrow bezel without deterioration of a display quality due to the uniform linear light of a high luminance.

Further, the number of the plurality of LED chips 203 may not increase, and disadvantages such as an increase of power consumption and fabrication cost may be prevented to nevertheless obtain a light weight and a thin profile.

Figure 2A:
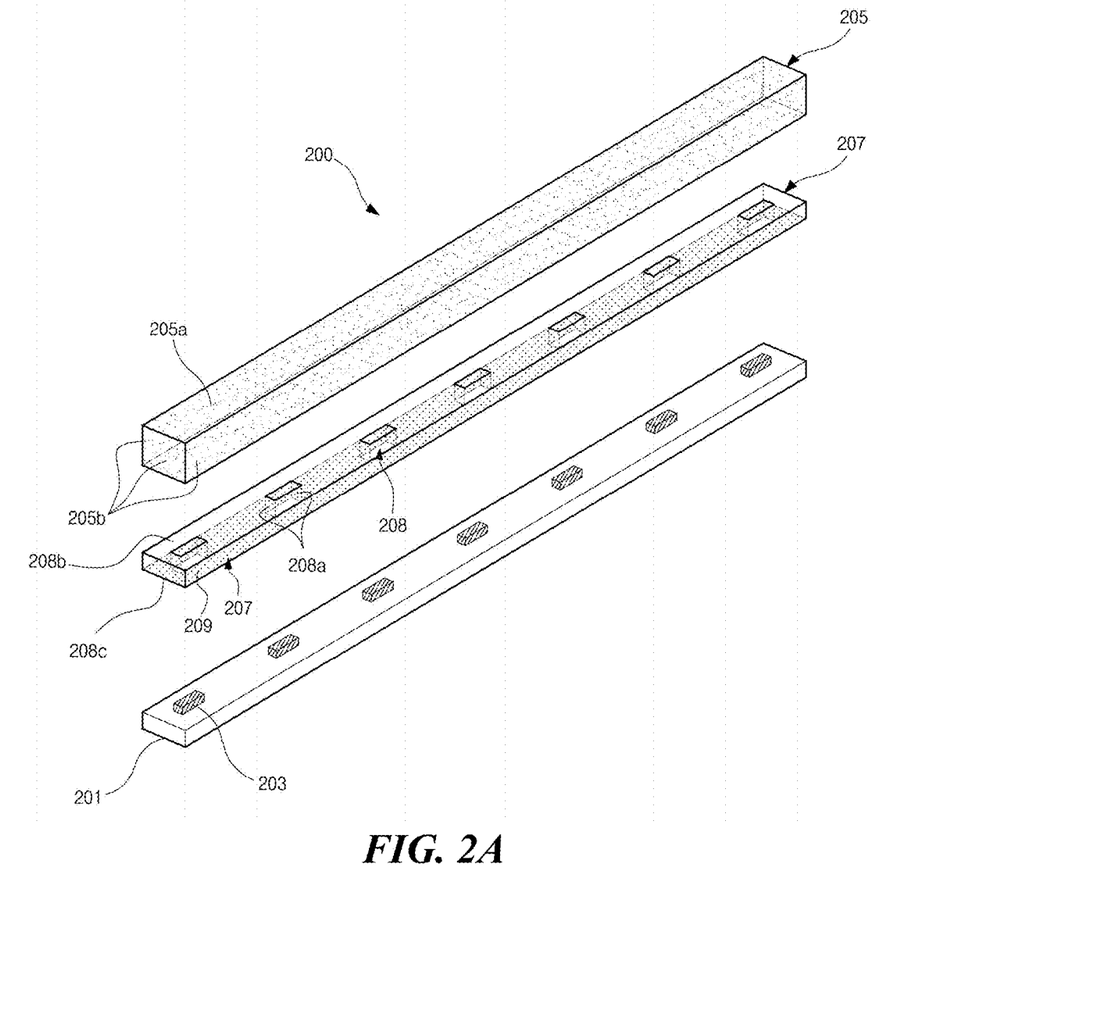
FIG. 2A is an exploded perspective view showing a light emitting diode assembly of a display device according to a first embodiment of the present disclosure.
Figure 2B:
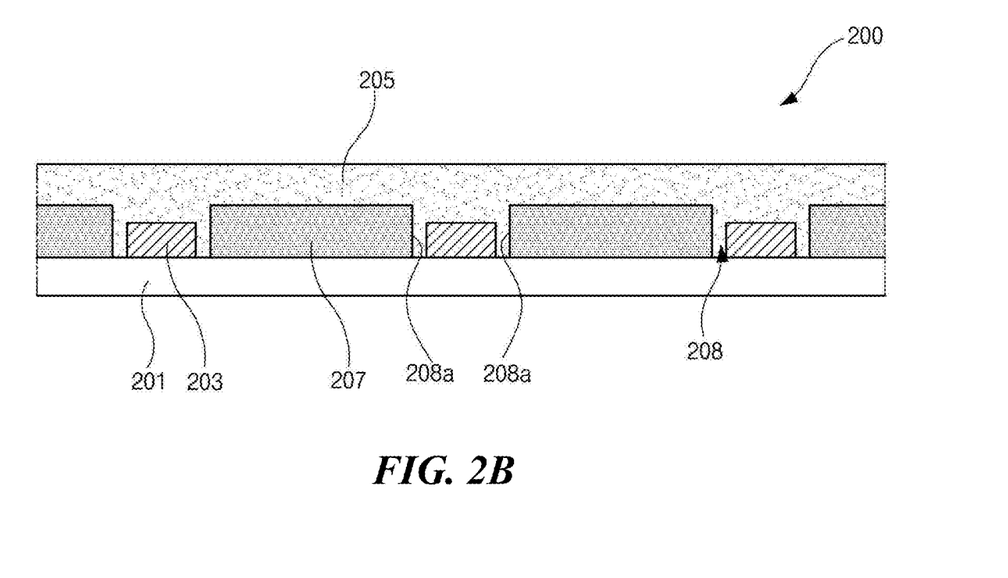
FIG. 2B is a cross-sectional view showing a light emitting diode assembly of a display device according to a first embodiment of the present disclosure.
Figure 3A:
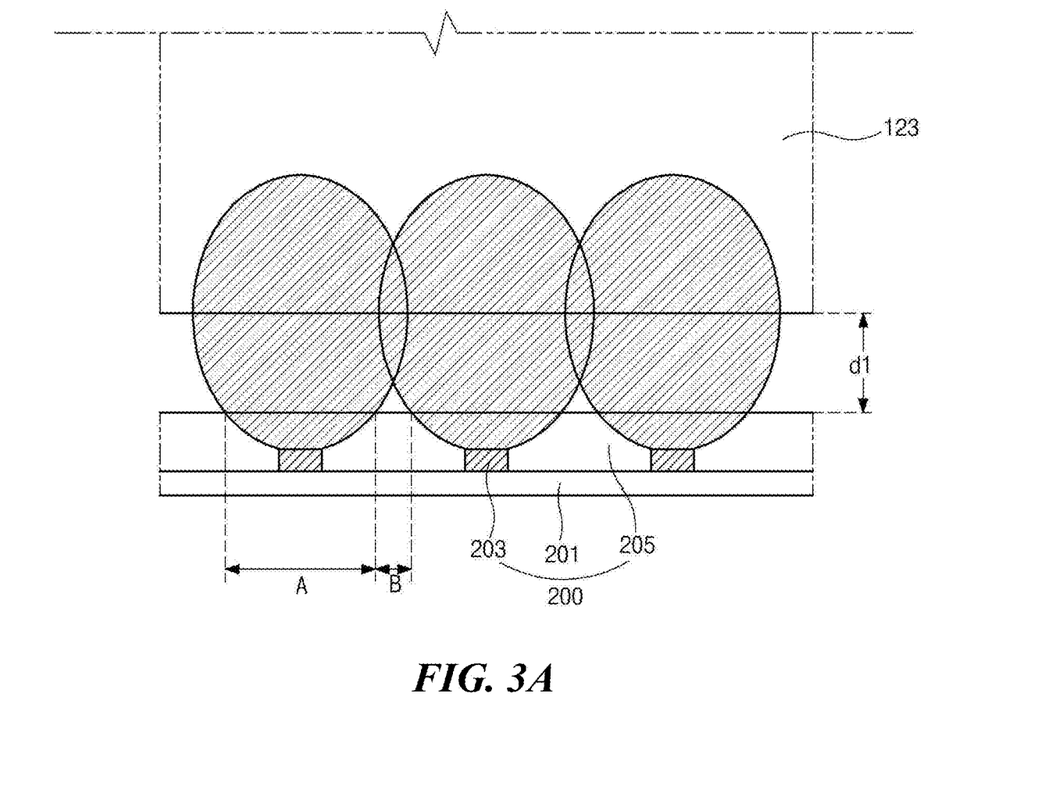
FIG. 3A is a cross-sectional view showing a directional angle of a light from a light emitting diode assembly without a light guiding panel of a display device according to a first embodiment of the present disclosure.
Figure 3B:
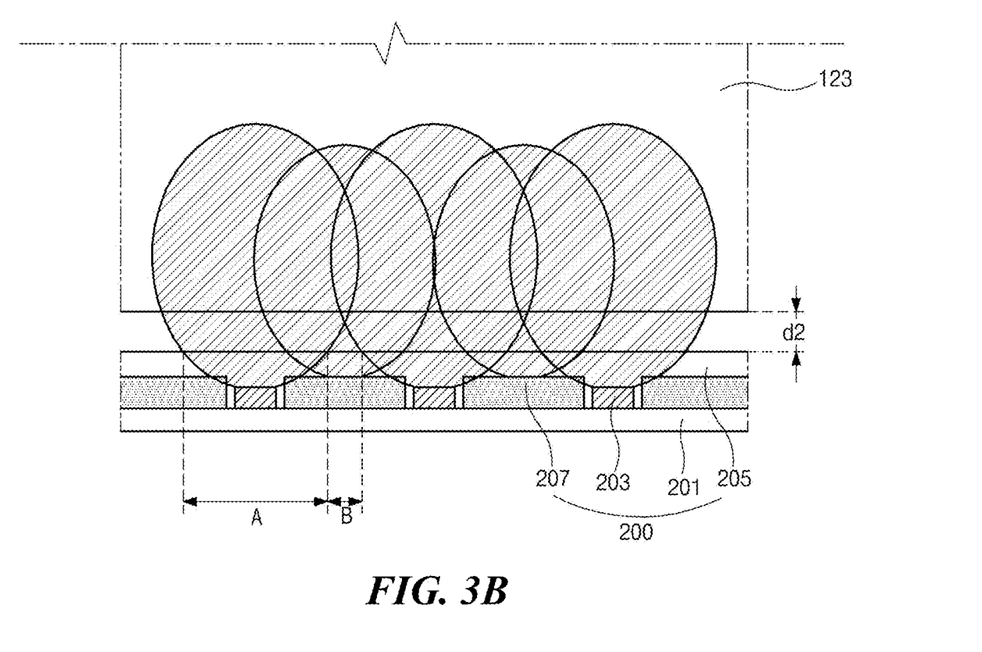
FIG. 3B is a cross-sectional view showing a directional angle of a light from a light emitting diode assembly with a light guiding panel of a display device according to a first embodiment of the present disclosure.

FIG. 2A is an exploded perspective view showing a light emitting diode assembly of a display device according to a first embodiment of the present disclosure, and FIG. 2B is a cross-sectional view showing a light emitting diode assembly of a display device according to a first embodiment of the present disclosure. FIG. 3A is a cross-sectional view showing a directional angle of a light from a light emitting diode assembly without a light guiding panel of a display device according to a first embodiment of the present disclosure, and FIG. 3B is a cross-sectional view showing a directional angle of a light from a light emitting diode assembly with a light guiding panel of a display device according to a first embodiment of the present disclosure.

In FIGS. 2A and 2B, the plurality of LED chips 203 emitting a blue colored light are mounted on the PCB 201 of a bar shape along a longitudinal direction of the PCB 201 through a surface mount technology (SMT) to be separated from each other, and the fluorescent lens 205 of a bar shape corresponding to a length of the PCB 201 is disposed over the plurality of LED chips 203.

The fluorescent lens 205 may include a yellow fluorescent material such as yttrium aluminum garnet doped with cerium (YAG:Ce) uniformly mixed in a resin. The fluorescent lens 205 may have an upper surface 205a where a light is emitted, and a plurality of side surfaces 205b perpendicular to the upper surface 205a. The plurality of LED chips 203 emitting a blue colored light is disposed in front of the PCB 203, and the upper surface 205a is disposed in front of the plurality of LED chips 203. In addition, the plurality of side surfaces 205b surround side surfaces of the plurality of LED chips 203 to contact the PCB 201.

The fluorescent lens 205 may have a semi-spherical shape or a half-cylindrical shape protruding from the PCB 201 toward an emission direction of a light of the plurality of LED chips 203.

When a current is applied to the plurality of LED chips 203, a blue colored light is emitted from the plurality of LED chips 203. A part of the blue colored light excites the yellow fluorescent material of the fluorescent lens 205, and a yellow colored light is emitted from the excited yellow fluorescent material. The other part of the blue colored light and the yellow colored light are mixed to generate a white colored light, and the white colored light is emitted to an exterior through the fluorescent lens 205.

Because the white colored light is emitted along a longitudinal direction of the LED assembly 200 toward a front of the fluorescent lens 205, the LED assembly 200 supplies a linear light.

In the LED assembly 200, the light guiding panel 207 is disposed between the PCB 201 having the plurality of LED chips 203 and the fluorescent lens 205. The light guiding panel 207 may have a bar shape corresponding to a length of the PCB 201 and may have a plurality of holes 208 along a longitudinal direction.

The plurality of holes 208 are disposed to correspond to the plurality of LED chips 203. When the light guiding panel 207 is put on the PCB 201, the plurality of LED chips 203 is disposed to penetrate through the plurality of holes 208, and the fluorescent lens 205 is disposed in front of the plurality of LED chips 203 and the light guiding panel 207.

The light guiding panel 207 has a guiding input surface 208a of an inner side surface of each hole 208 facing each LED chip 203 and a guiding output surface 208b of an upper surface facing the upper surface 205a of the fluorescent lens 205. The guiding input surface 208a and the guiding output surface 208b are perpendicular to each other. Because the plurality of LED chips 203 are disposed at both sides of the plurality of holes 208 of the light guiding panel 207, the light guiding panel 207 may include first and second guiding input surfaces 208a along the longitudinal direction.

As a result, when the blue colored light emitted from the plurality of LED chips 203 enters the light guiding panel 207 through the first and second guiding input surfaces 208a, the blue colored light is uniformly diffused in the light guiding panel 207 through a plurality of total reflections to be emitted through the guiding output surface 208b.

The light guiding panel 207 may include at least one of polymethyl methacrylate (PMMA), polycarbonate ('PC') and polystyrene (PS).

The light guiding panel 207 further has a lower surface 208c facing the guiding output surface 208b, and a second pattern 209 may be formed on the lower surface 208c so that the blue colored light can be uniformly diffused.

To guide the blue colored light incident to the light guiding panel 207, the second pattern 209 may be formed to correspond to the blue colored light having a wavelength within a range of about 450 nm to about 490 nm. For example, the second pattern 209 may include one of an elliptical pattern, a polygonal pattern, and a hologram pattern. The second pattern 209 may be formed on the lower surface 208c of the light guiding panel 207 through a printing method or an injecting method.

Because the blue colored light has a scattering property superior to a guiding property in the light guiding panel 207, the second pattern 209 corresponding to the blue colored light is formed on the lower surface 208c of the light guiding panel 207.

For example, a pattern gap between the adjacent second patterns 209 for a total reflection of the blue colored light in the light guiding panel 207 may be defined according to a following Equation 1.

$$P = m\lambda / [(n2)*(\sin \theta t) - (n1)*(\sin \theta i)],$$  [Equation 1]

(P: pattern gap, m: diffraction order, λ: wavelength, n1: refractive index of light guiding panel, n2: refractive index of air, θi: incident angle, θt: refractive angle)

For example, when the blue colored light emitted from the plurality of LED chips 203 has a wavelength of about 440 nm and the light guiding panel 207 is formed of polycarbonate having a refractive index of about 1.5, the blue colored light may have an incident angle over about 41.8 degrees for a total reflection in the light guiding panel 207. When the blue colored light having an incident angle of about 55 degrees is totally reflected as a diffraction light of a first order having a refractive angle of about 90 degrees, the pattern gap may become about 360 nm according to Equation 1.

As a result, the pattern gap of the second pattern 209 may be determined according to Equation 1, and the blue colored light incident to the light guiding panel 207 is uniformly diffused in the light guiding panel 207 to be emitted through the guiding output surface 208b.

In the LED assembly 200 of the backlight unit 120 of the display device 100 according to a first embodiment of the present disclosure, because the plurality of LED chips 203 spaced apart from each other are mounted on the PCB 201 and the fluorescent lens 205 of a bar shape is disposed over the plurality of LED chips 203, a linear light having advantages such as a small size, a low power consumption, and a high reliability of the plurality of LED chips 203 may be supplied and a narrow bezel may be obtained.

For example, because the light guiding panel 207 is disposed between the adjacent two of the plurality of LED chips 203, a further uniform linear light of a high luminance is supplied and a further narrow bezel is obtained.

In FIG. 3A, because the plurality of LED chips 203 spaced apart from each other are mounted on the PCB 201 and the fluorescent lens 205 having a bar shape is disposed over the plurality of LED chips 203, an optical gap or an air gap is reduced as compared with a backlight unit having an LED of a point light source having a predetermined directional angle, and a narrow bezel is obtained.

Because a luminance of a region B corresponding to a space between the adjacent LED chips 203 is lower than a luminance of a region A corresponding to the LED chip 203, a part of the blue colored light emitted from the LED chip 203 toward a side surface of the LED chip 203 may not pass through the fluorescent lens 205 to be lost.

As a result, an optical gap or an air gap of a first distance d1 may be required between the LED assembly 200 and the incident surface of the light guide plate 123.

In FIG. 3B, the blue colored light emitted from the LED chip 203 may enter the light guiding panel 207 and may be totally reflected many times in the light guiding panel 207. The blue colored light may be uniformly diffused in the light guiding panel 207 and may be emitted through the guiding output surface 208b of the light guiding panel 207 to enter the fluorescent lens 205.

Because the light guiding panel 207 is disposed between the adjacent LED chips 203, a part of the blue colored light emitted from the LED chip 203 toward a side surface of the LED chip 203 may be guided without loss by the light guiding panel 207 to enter the fluorescent lens 205 in front of the light guiding panel 207.

As a result, a white colored light of a high luminance is emitted even in a region B corresponding to a space between the adjacent LED chips 203, and the LED assembly 200 supplies a uniform linear light of a high luminance along a longitudinal direction.

In the LED assembly 200 according to the first embodiment of the present disclosure, the linear white colored light is uniformly emitted in both of a region A corresponding to the LED chip 203 and a region B corresponding to a space between the adjacent LED chips 203. In addition, because the loss of the part of the blue colored light emitted from the LED chip 203 toward a side surface of the LED chip 203 is reduced or minimized, the light of a higher luminance is supplied without increasing the number of the plurality of LED chips 203.

Further, because an optical gap or an air gap of a second distance d2 smaller than the first distance d1 may be required between the LED assembly 200 and the incident surface of the light guide plate 123, the optical gap or the air gap is further reduced and a narrower bezel is obtained.

In the display device 100 according to the first embodiment of the present disclosure, because the light guiding panel 207 is disposed between the adjacent LED chips 203 of the LED assembly 200 of the backlight unit 120, the display device 100 may have advantages such as a small size, a low power consumption, and a high reliability due to the plurality of LED chips 203 emitting a blue colored light. In addition, the display device 100 may have a narrow bezel without deterioration of a display quality due to the uniform linear light of a high luminance.

Further, the number of the plurality of LED chips 203 may not increase, and disadvantages such as an increase of power consumption and fabrication cost may be prevented to nevertheless obtain a light weight and a thin profile.

Figure 4A:
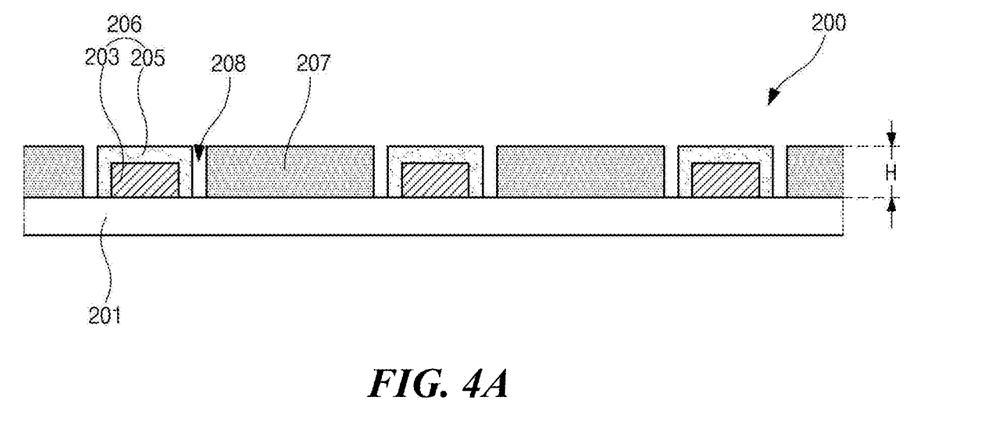
FIG. 4A is a cross-sectional view showing a light emitting diode assembly of a display device according to a second embodiment of the present disclosure.
Figure 4B:
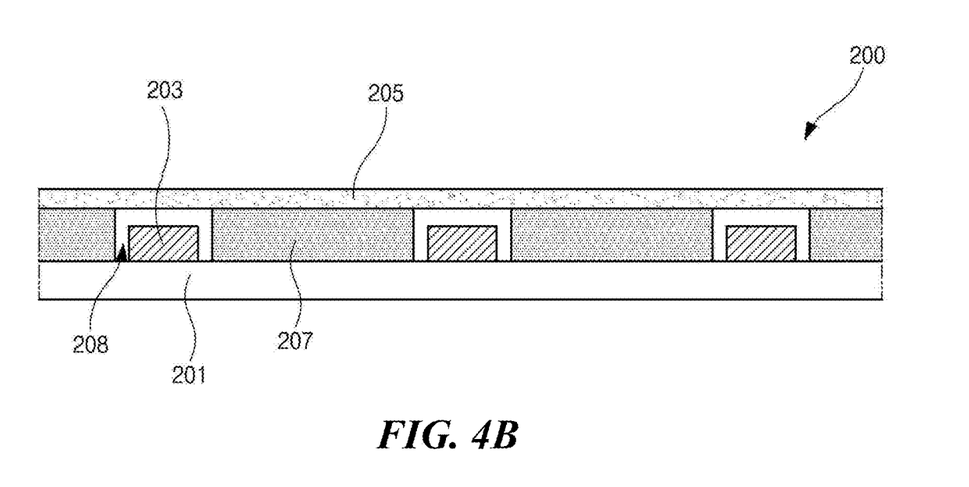
FIG. 4B is a cross-sectional view showing a light emitting diode assembly of a display device according to a third embodiment of the present disclosure.

FIGS. 4A and 4B are cross-sectional views showing a light emitting diode assembly of a display device according to second and third embodiments, respectively, of the present disclosure.

In FIG. 4A, a plurality of LED packages 206 are mounted on a PCB 201 to be separated from each other. An LED chip 203 and a fluorescent lens 205 constitute each of the plurality of LED packages 206 such that a side surface of the LED chip 203 faces and contacts a side surface of the fluorescent lens 205. The fluorescent lens 205 contacts and surrounds upper and side surfaces of the LED chip 203.

Each of the plurality of LED packages 206 may be formed by injecting a resin having a yellow fluorescent material on the LED chip 203 using a syringe. Alternatively, each of the plurality of LED packages 206 may be formed by disposing the fluorescent lens 205 having a yellow fluorescent material on the LED chip 203.

A light guiding panel 207 is disposed on the PCB 201 having the plurality of LED packages 206 thereon. The light guiding panel 207 may have a plurality of holes 208 where the plurality of LED packages 206 penetrate.

The light guiding panel 207 and the fluorescent lens 205 of the plurality of LED packages 206 through the plurality of holes 208 of the light guiding panel 207 are flush with each other such that a top surface of the light guiding panel 207 and top surfaces of the fluorescent lens 205 of the plurality of LED packages 206 constitute a single plane. For example, the light guiding panel 207 and the plurality of LED packages 206 may have the same height H as each other.

A part of a blue colored light emitted from the LED chip 203 is converted into a yellow colored light through the fluorescent lens 205. The other part of the blue colored light and the yellow colored light are mixed to generate a white colored light. When the light guiding panel 207 and the plurality of LED packages 206 have the same height H as each other, a side surface of the plurality of LED packages 206 faces a side surface of the light guiding panel 207. As a result, the white colored light through the side surface of the fluorescent lens 205 enters the light guiding panel 207.

In FIG. 4B, a plurality of LED chips 203 are mounted on a PCB 201 to be separated from each other, and a light guiding panel 207 having a plurality of holes 208 is disposed on the PCB 201. A fluorescent lens 205 of a sheet is disposed on the plurality of LED chips 203 and the light guiding panel 207.

Figure 5A:
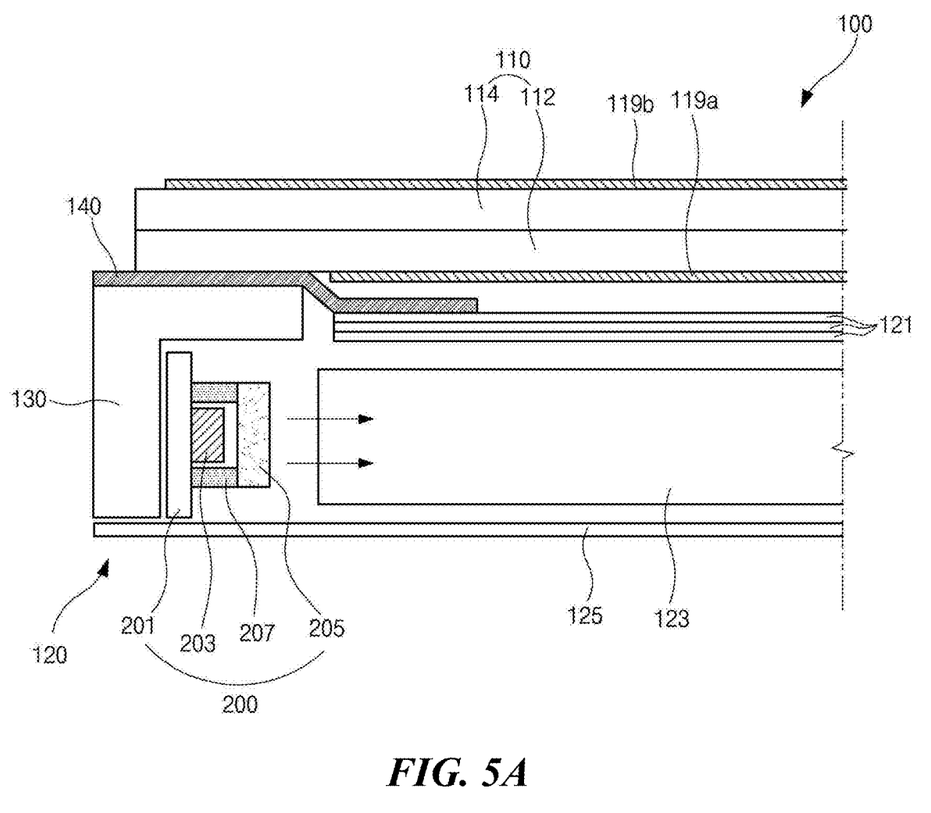
FIG. 5A is a cross-sectional view showing a display device according to a third embodiment of the present disclosure.
Figure 5B:
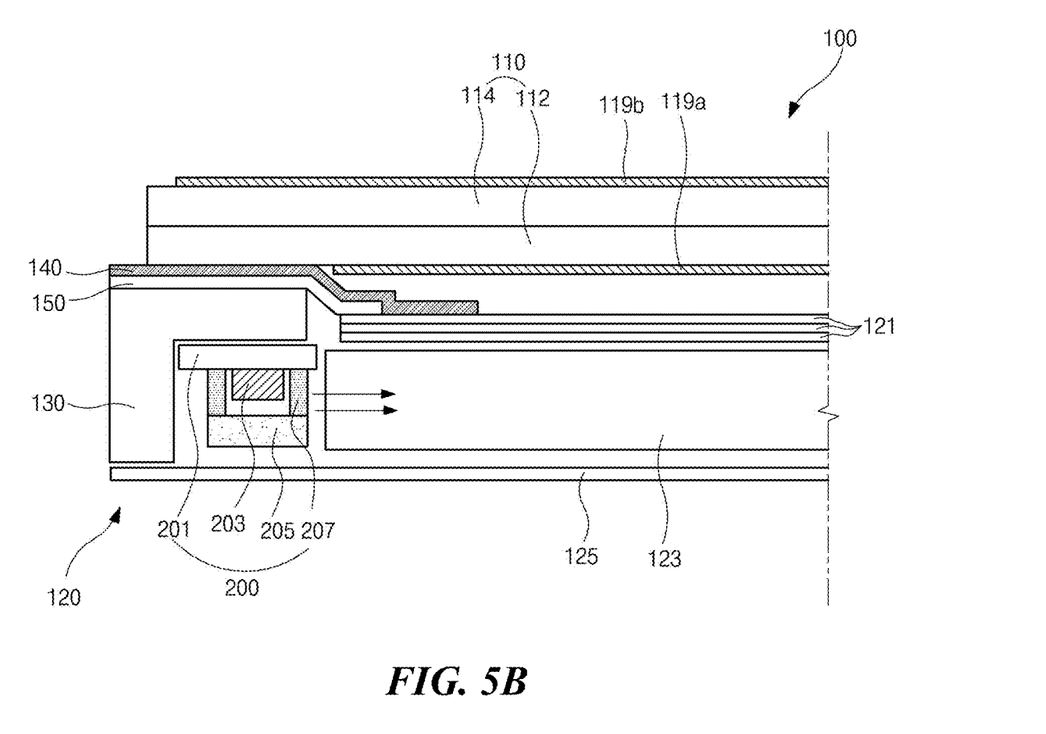
FIG. 5B is a cross-sectional view showing a display device according to a fourth embodiment of the present disclosure.

FIG. 5A is a cross-sectional view showing a display device according to a third embodiment of the present disclosure, and FIG. 5B is a cross-sectional view showing a display device according to a fourth embodiment of the present disclosure.

In FIGS. 5A and 5B, a display device 100 according to third and fourth embodiments of the present disclosure includes a backlight unit 120 and a liquid crystal panel 110 over the backlight unit 120. The backlight unit 120 includes a reflecting plate 125, a light guide plate 123, an LED assembly 200, and a plurality of optical sheets 121. The liquid crystal panel 110 includes first and second substrates 112 and 114, a liquid crystal layer between the first and second substrates 112 and 114, and first and second polarizing plates 119a and 119b on outer surfaces of the first and second substrates 112 and 114, respectively.

A light shielding tape 140 is disposed on an edge portion between the backlight unit 120 and the liquid crystal panel 110. The backlight unit 120 and the liquid crystal panel 110 are integrated and modularized by a frame 130.

In FIG. 5A, the LED assembly 200 has a top view type such that a surface of a PCB 201 where a plurality of LED chips 203 are mounted faces an incident surface of the light guide plate 123. The PCB 201 contacts and is fixed to an inner side surface of the frame 130, and the plurality of LED chips 203 are spaced apart from each other.

A light guiding panel 207 having a plurality of holes 208 (e.g., of FIG. 4B) where the plurality of LED chips 203 penetrate is disposed over the PCB 201, and a fluorescent lens 205 having a yellow fluorescent material is disposed over the plurality of LED chips 203 and the light guiding panel 207.

A blue colored light from the plurality of LED chips 203 of the LED assembly 200 is converted into a white colored light through the fluorescent lens 205, and the white colored light is emitted toward a front direction of the LED assembly 200. The white colored light enters the light guide plate 123 through the incident surface thereof and is processed in the light guide plate 123 to form a plane light. The plane light passes through the plurality of optical sheets 121.

The plane light having a high quality and a high uniformity through the plurality of optical sheets 121 is supplied to the liquid crystal panel 110, and the liquid crystal panel 110 displays an image using the plane light.

Because the LED assembly 200 supplies a uniform linear light of a high luminance to the light guide plate 123, the display device 100 has a narrow bezel. In addition, disadvantages such as an increase of power consumption and fabrication cost may be prevented to nevertheless obtain a light weight and a thin profile.

In FIG. 5B, the LED assembly has a side view type such that a light is emitted along a direction parallel to the PCB 201. A reflecting sheet 150 is further disposed between the frame 130 and the light shielding tape 140.

The reflecting sheet 150 prevents a leakage of a light from the backlight unit 120 with the light shielding tape 140. In addition, because the reflecting sheet 150 having a white color reflects the light from the backlight unit 120 toward the light guide plate 123, a light usage efficiency increases.

The PCB 201 contacts and is fixed to an inner upper surface of the frame 130, and the plurality of LED chips 203 are mounted on the PCB 201 to be spaced apart from each other.

A light guiding panel 207 having a plurality of holes 208 (e.g., of FIG. 4B) where the plurality of LED chips 203 penetrate is disposed over the PCB 201, and a fluorescent lens 205 having a yellow fluorescent material is disposed over the plurality of LED chips 203 and the light guiding panel 207.

A blue colored light from the plurality of LED chips 203 of the LED assembly 200 is converted into a white colored light through the fluorescent lens 205, and the white colored light is emitted toward a side direction of the LED assembly 200. The white colored light enters the light guide plate 123 through the incident surface thereof and is processed in the light guide plate 123 to form a plane light. The plane light passes through the plurality of optical sheets 121.

The plane light having a high quality and a high uniformity through the plurality of optical sheets 121 is supplied to the liquid crystal panel 110, and the liquid crystal panel 110 displays an image using the plane light.

Because the LED assembly 200 supplies a uniform linear light of a high luminance to the light guide plate 123, the display device 100 has a narrow bezel. In addition, disadvantages such as an increase of power consumption and fabrication cost may be prevented to nevertheless obtain a light weight and a thin profile.

The display device 100 according to the third and fourth embodiments of the present disclosure may have advantages such as a small size, a low power consumption, and a high reliability due to the plurality of LED chips 203 emitting a blue colored light. In addition, the display device 100 may have a narrow bezel without deterioration of a display quality due to the uniform linear light of a high luminance.

Figure 6:
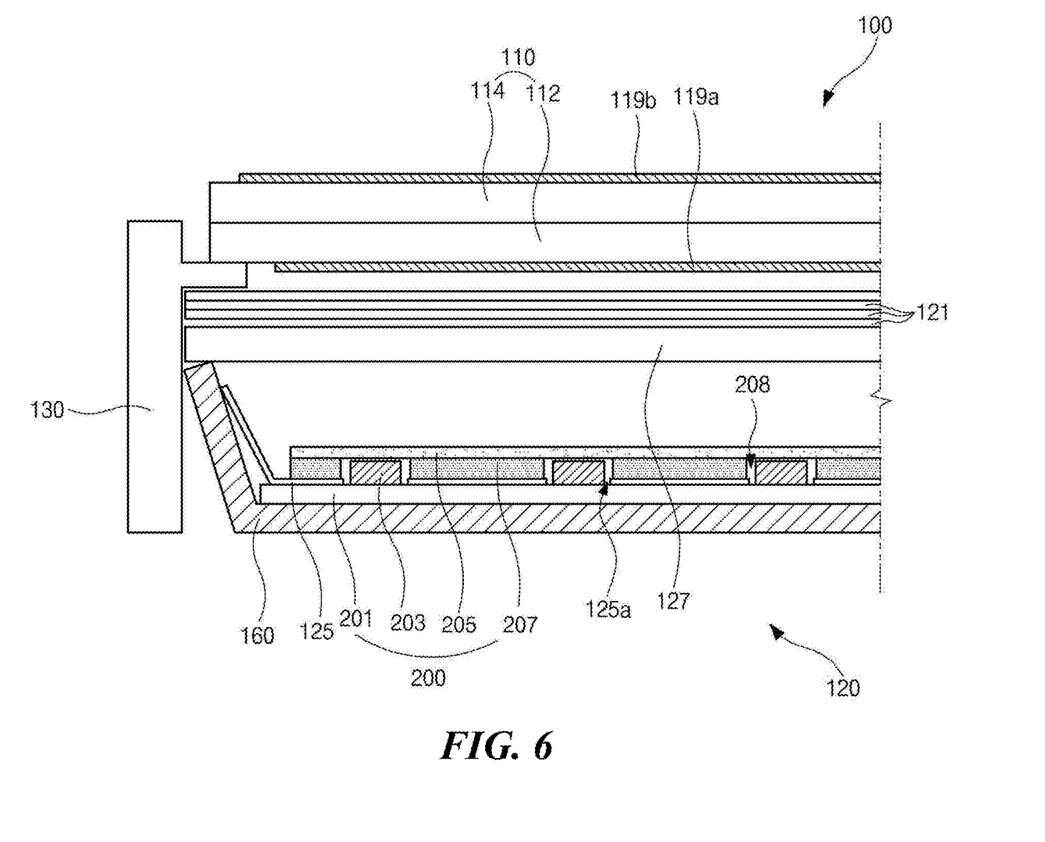
FIG. 6 is a cross-sectional view showing a display device according to a fifth embodiment of the present disclosure.

FIG. 6 is a cross-sectional view showing a display device according to a fifth embodiment of the present disclosure.

In FIG. 6, a display device 100 includes a liquid crystal panel 110, a backlight unit 120, a main frame 130, and a bottom frame 160. An LED assembly 200 of the backlight unit 120 is surrounded by the main frame 130 and is disposed on the bottom frame 160. The LED assembly 200 includes a PCB 201, a plurality of LED chips 203, a reflecting plate 125, a fluorescent lens 205, and a light guiding panel 207.

The reflecting plate 125 is disposed over the PCB 201, and the light guiding panel 207 is disposed over the reflecting plate 125. The reflecting plate 125 has a plurality of first holes 125a and the light guiding panel 207 has a plurality of second holes 208. The plurality of LED chips 203 penetrate through the plurality of first holes 125a and the plurality of second holes 208, respectively, to be exposed.

The fluorescent lens 205 of a sheet having a yellow fluorescent material is disposed over the plurality of LED chips 203 that are exposed through the plurality of first holes 125a, the plurality of second holes 208, and the light guiding panel 207. A diffusing plate 127 and a plurality of optical sheets 121 are disposed over the fluorescent lens 205 to be spaced apart from the fluorescent lens 205.

A liquid crystal panel 110 is disposed over the plurality of optical sheets 121. The liquid crystal panel 110 includes first and second substrates 112 and 114, a liquid crystal layer between the first and second substrates 112 and 114, and first and second polarizing plates 119a and 119b on outer surfaces of the first and second substrates 112 and 114, respectively.

The plurality of LED chips 203 may be disposed as a matrix shape and may supply a plane light to the light guide plate.

An optical gap or an air gap of a backlight unit 120 is reduced due to the light guiding panel 207 between the adjacent LED chips 203, even in the display device 100 having a direct light type backlight unit 120.

As a result, the display device 100 may have advantages such as a small size, a low power consumption, and a high reliability due to the plurality of LED chips 203 emitting a blue colored light. In addition, the display device 100 may have a narrow bezel without deterioration of a display quality due to the uniform linear light of a high luminance.

Further, the number of the plurality of LED chips 203 does not increase, and disadvantages such as an increase of power consumption and fabrication cost may be prevented to nevertheless obtain a light weight and a thin profile.

It will be apparent to those skilled in the art that various modifications and variations can be made in a display device of the present disclosure without departing from the sprit or scope of the disclosure. Thus, it is intended that the present disclosure covers the modifications and variations of these aspects provided they come within the scope of the appended claims and their equivalents.

What is claimed is:

1. A display device, comprising:
a liquid crystal panel;
an optical sheet under the liquid crystal panel; and
a light emitting diode (LED) assembly configured to supply a light to the liquid crystal panel through the optical sheet, the LED assembly including:
a printed circuit board (PCB);
a plurality of LED chips on the PCB, the plurality of LED chips being configured to emit a blue colored light;
a fluorescent lens extending over the plurality of LED chips; and
a light guiding panel between an adjacent two of the plurality of LED chips,
wherein the light emitted from the plurality of LED chips enters the light guiding panel and is diffused in the light guiding panel through a plurality of total reflections to be emitted from the light guiding panel,
wherein the light guiding panel surrounds and faces four side surfaces of each of the plurality of LED chips,
wherein the light guiding panel includes a plurality of holes, and
wherein the plurality of LED chips respectively penetrate the plurality of holes.

2. The display device of claim 1, wherein the light guiding panel includes a pattern configured to totally reflect the blue colored light.

3. The display device of claim 1, wherein the light guiding panel has a bar shape corresponding to a length of the PCB.

4. The display device of claim 1, wherein the fluorescent lens is over the plurality of LED chips and the light guiding panel.

5. The display device of claim 1, wherein the fluorescent lens has a sheet shape over the plurality of LED chips and the light guiding panel.

6. The display device of claim 1, wherein the fluorescent lens includes a yellow fluorescent material.

7. The display device of claim 1, further comprising:
a light guide plate under the optical sheet; and
a main frame surrounding the LED assembly.

8. The display device of claim 7, wherein:
the PCB contacts and is fixed to an inner side surface of the main frame; and
the LED assembly is at a side of the light guide plate to supply a linear light to the light guide plate through the fluorescent lens.

9. The display device of claim 7, wherein:
the PCB contacts and is fixed to an inner upper surface of the main frame; and
the LED assembly is at a side of the light guide plate to supply a linear light to the light guide plate through the light guiding panel.

10. The display device of claim 1, further comprising:
a diffusing plate under the optical sheet;
a main frame surrounding the LED assembly; and
a bottom frame under the LED assembly.

11. The display device of claim 10, wherein:
the PCB contacts and is fixed to the bottom frame; and
the LED assembly is under the diffusing plate to supply a plane light to the diffusing plate.

12. The display device of claim 1, wherein the light enters the light guiding panel through a side surface and is emitted from the light guiding panel through a front surface perpendicular to the side surface.

13. A display device, comprising:
a liquid crystal panel;
an optical sheet under the liquid crystal panel; and
a light emitting diode (LED) assembly configured to supply a light to the liquid crystal panel through the optical sheet, the LED assembly including:
 a printed circuit board (PCB);
 a plurality of LED chips on the PCB, the plurality of LED chips being configured to emit a blue colored light;
 a respective fluorescent lens over each of the plurality of LED chips, a fluorescent material of the fluorescent lens respectively directly contacting and covering the entire top and outer side surfaces of each of the plurality of LED chips; and
 a light guiding panel between an adjacent two of the plurality of LED chips,
wherein the light emitted from the plurality of LED chips enters the light guiding panel and is diffused in the light guiding panel through a plurality of total reflections to be emitted from the light guiding panel,
wherein the light guiding panel surrounds and faces four side surfaces of each of the plurality of LED chips,
wherein the light guiding panel includes a plurality of holes, and
wherein the plurality of LED chips respectively penetrate the plurality of holes.

14. The display device of claim 13, wherein the fluorescent lens is separated from an inner sidewall of a respective one of the holes and has a flat top surface.

15. The display device of claim 13, wherein a respective one of the holes is between each of the fluorescent lenses and the light guiding panel.

16. The display device of claim 13, wherein:
the fluorescent lens includes a plurality of lenses; and
each of the plurality of lenses respectively contacts and surrounds each of the plurality of LED chips.

17. The display device of claim 16, wherein the fluorescent lens and the light guiding panel constitute a same plane.

18. The display device of claim 13, wherein the light guiding panel includes a pattern configured to totally reflect the blue colored light.

19. The display device of claim 1, wherein the light guiding panel has a bar shape corresponding to a length of the PCB.

20. The display device of claim 1, wherein the fluorescent lens contacts a whole of a top surface of the light guiding panel and has a flat top surface.

* * * * *